United States Patent [19]
Carrington

[11] 3,769,520
[45] Oct. 30, 1973

[54] DEMAND LIMIT CONTROL SYSTEM

[76] Inventor: Donald L. Carrington, 650 Brooke Rd., Glenside, Pa. 19038

[22] Filed: Nov. 13, 1972

[21] Appl. No.: 305,890

[52] U.S. Cl. ................................. 307/41, 317/139
[51] Int. Cl. ............................................ H02j 13/00
[58] Field of Search ................... 307/35, 38, 39, 41; 317/139; 318/102; 323/25, 76

[56] References Cited
UNITED STATES PATENTS
| | | | |
|---|---|---|---|
| 3,538,391 | 11/1970 | Bensley et al. | 307/41 X |
| 3,697,769 | 10/1972 | Schneier | 307/41 |
| 3,489,913 | 1/1970 | Wildi | 307/41 |

Primary Examiner—A. D. Pellinen
Attorney—Zachary T. Wobensmith

[57] ABSTRACT

This system provides for automatically energizing and deenergizing electrical loads according to priority designations thereof so that the overall power requirement for a given system of electrical loads does not exceed a limiting value. The system provides a means to automatically set a voltage divider network for a range of load demands that the system will monitor and control. Further, the system provides for sequentially turning on electrical loads and turning off electrical loads so that certain electrical loads will have a priority over certain other loads. In addition, the system permits the electrical loads to be energized such that expendable electrical loads will temporarily be removed from an energy demanding status until priority electrical loads have been satisfied.

8 Claims, 6 Drawing Figures

3,769,520

DEMAND LIMIT CONTROL SYSTEM

BACKGROUND OF THE INVENTION

1. Field of the Invention

This invention relates to demand limit control systems and more particularly to a system for automatically applying or removing loads to remain within a predetermined load limit.

2. Description of the Prior Art

In the prior art electrical load switching systems have been employed to turn on and turn off electrical loads, which systems necessitate the setting of a voltage divider network each time the system is employed in order to develop the threshold voltages (or reference voltages) between which the system is to operate. In other words, a first voltage is developed by such a manually set voltage divider to define a "low" control voltage below which the system will accept new loads, thereby increasing the control voltage. A second voltage is also developed by such a manually set voltage divider to define a "high" control voltage above which the system will react to de-energize loads and thereby reduce the overall load demand to an acceptable value. The present system provides a means to automatically adjust a voltage divider network to develop a set of reference voltages. In addition the present system acts to temporarily disconnect low priority loads until a priority load has been satisfied and no longer needs power. After such an occasion the low priority loads are connected back into the system.

SUMMARY OF THE INVENTION

The present system employs a current transformer means to sample the overall electrical energy being supplied to a plurality of electrical loads forming an electrical system. The output of the sampling means is a d.c. signal which is transmitted through three channels of a rotary switch means. The rotary switch means provides three automatically adjustable voltage divider networks. One voltage divider network functions to develop a first control voltage which, if it does not exceed a first certain value, will permit signals to be passed to the control means (relays) of the various loads so that these loads may be energized if their control means has been energized. If this first control signal exceeds said first certain value it will cause a control relay to be energized thereby intercepting the signals which are passed to the various control means of the respective loads. A second resistor network, or channel, of the rotary switch means develops a second control signal which, if it does not exceed a second certain value, will not act to disconnect any of the connected loads but which on the other hand if it does exceed said second certain value will energize a control relay which will transmit pulses to disconnect load devices. As the loads are disconnected or de-energized the second control signal will decrease in value, until the second control signal no longer exceeds said second certain value. The third resistor network of the rotary switch means develops a third control signal which, if it exceeds a third certain value, acts to energize a means to step said rotary switch means to a new position. Accordingly, the rotary switch means could eventually be in the maximum resistor position for the range of the power to be monitored and this selection will have been done automatically. The resistor networks can be set on the rotary switch so that said first and second certain values will define a voltage range which will permit the system to select a group of loads which it will be possible to energize but whose number would ordinarily exceed the permissible number of loads if the total connected load is energized at the same time. However, since all the loads are not in fact energized at the same time the system does not operate in excess of its allowable power demand. On the occasion that the loads which have been selected to be energized are in fact all energized, the system will respond to turn off expendable loads on a temporary basis if the total connected load is high and at some later time to turn on these expendable loads again, when the overall power demand is reduced.

BRIEF DESCRIPTION OF THE DRAWINGS

The nature and characteristic features of the invention will be more readily understood from the following description taken in connnection with the accompanying drawings forming part hereof, in which:

FIG. 4 is a lay-out showing how FIGS. 2, 3A, 3B and 3C should be connected together to form a complete wiring diagram of the present system.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Figure 1:
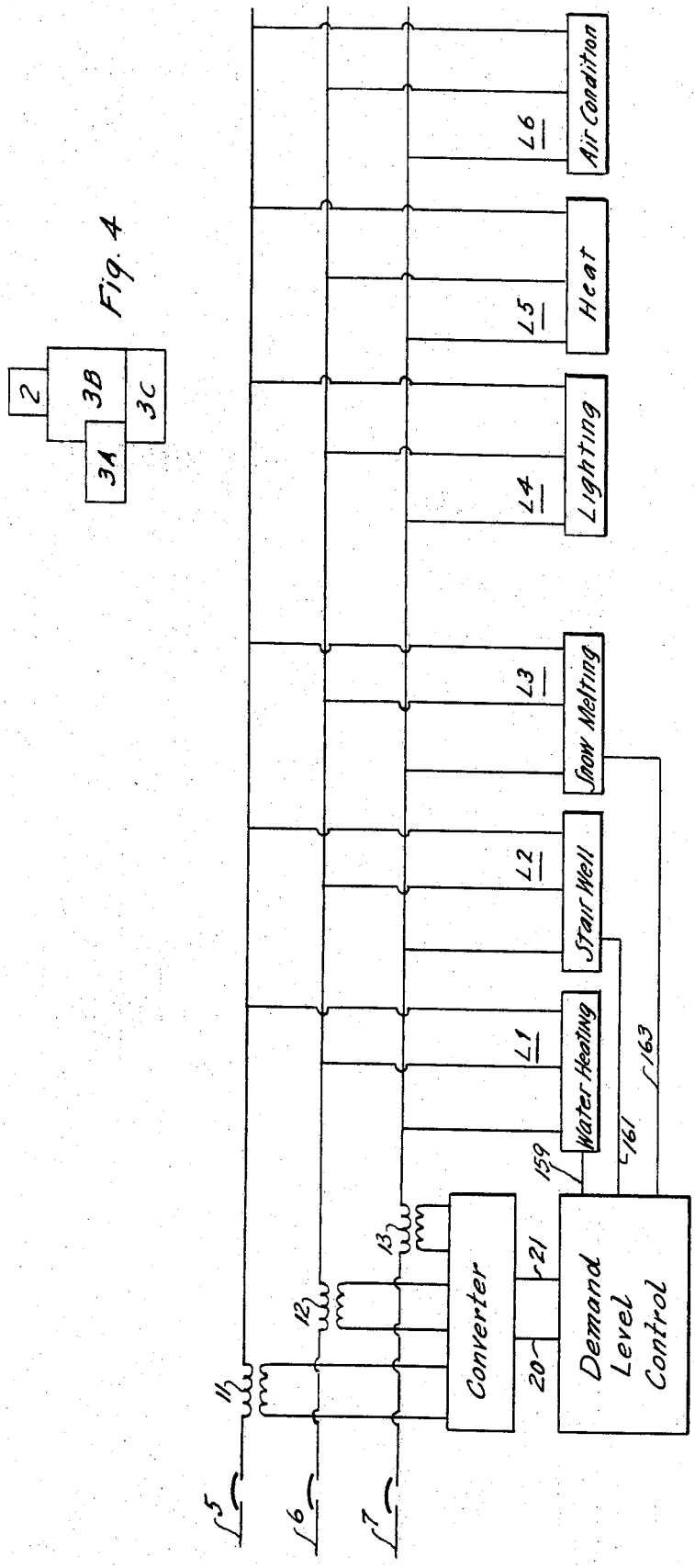
FIG. 1 is a schematic circuit diagram showing an electrical system with a plurality of loads for demand limit control.

In FIG. 1, a system is shown merely by way of illustration, having a plurality of loads, some of which, such as loads L1, L2 and L3, as for water heating, stair well illumination and snow melting, are expendable and others of which, such as loads L4, L5 and L6, as for lighting, heating and air conditioning are unexpendable. Power leads 5, 6 and 7, which may be 115 or 230 volt ac., are provided to which the loads are connected through a conventional main circuit breaker. The power leads 5, 6 and 7, have the primary windings of transformers 11, 12 and 13 connected thereto for purposes to be explained.

Figure 2:
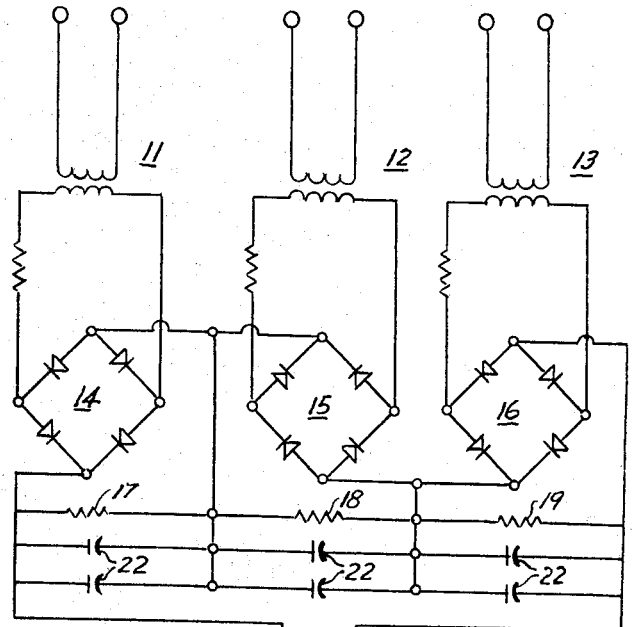
FIG. 2 is a schematic circuit diagram of a current transformer and signal rectifying means for use with the system of FIG. 1.

In FIG. 2 there is shown the three transformers 11, 12 and 13 and their connections. The primary winding of each of these transformers is connected to a current transformer of a known ratio and in such a way as to monitor the total current being required by all the loads which the system is monitoring and controlling. The secondaries of the transformers 11, 12 and 13 are connected to the full wave rectifiers 14, 15 and 16 and the outputs of these rectifiers are connected to the resistors 17, 18 and 19 so that there is a summation of the output voltages which summation appears at the terminals 20 and 21. The resistors 17, 18 and 19 are shunted by the capacitors 22. It will be noted that the diodes in the full wave rectifiers 14, 15 and 16 are connected such that the voltage summation has the polarities shown on the terminals 20 and 21.

Figure 3A:
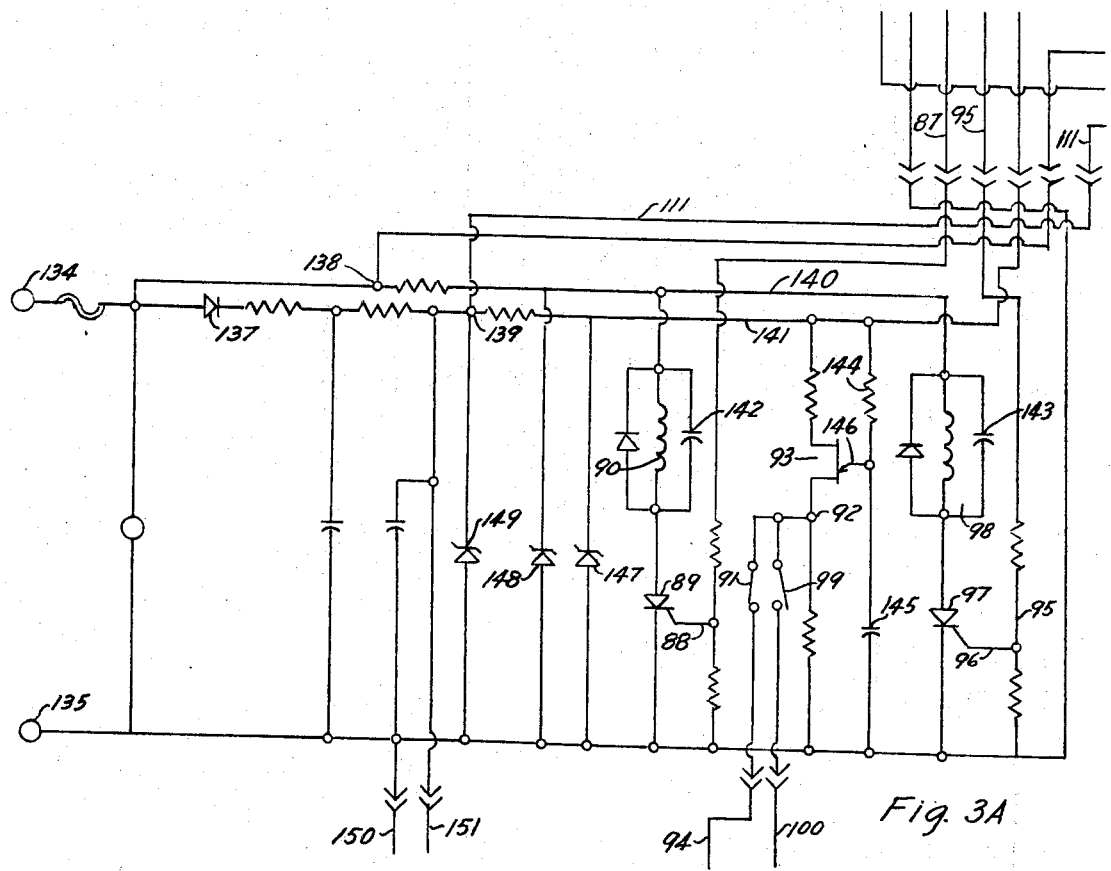
FIG. 3A is a schematic circuit diagram of a signal center circuit.
Figure 3B:
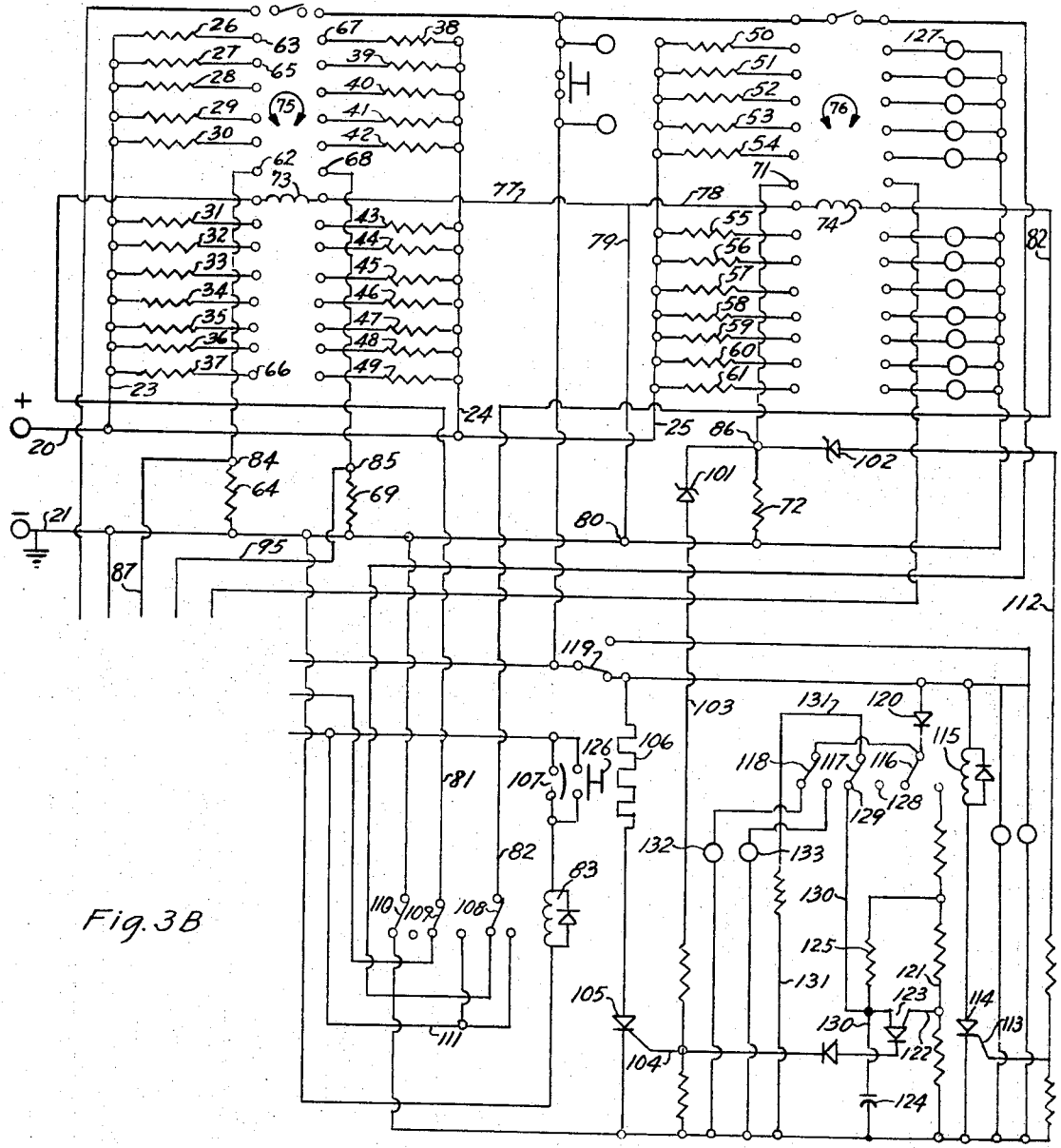
FIG. 3B is a schematic wiring diagram of two double-pole 12-position, solenoid actuated rotary switch arrangements.

The d.c. voltage developed at the terminals 20 and 21 is applied to the terminals 20 and 21 of FIG. 3B wherein terminal 21 is shown connected to ground. The positive signal applied to the terminal 20 is applied to the lines 23, 24 and 25. Line 23 is the common line to each of the resistors 26–37. Line 24 is the common connection to each of the resistors 38–49. Line 25 is the common connection to each of the resistors 50–61. The resistors 26–37 represent one set of resistors on a rotary switch and are arranged such that as the switch is advanced each of the non-common terminals of the respective resistors is connected to the common terminal 62. In other words, when the switch is in the first position terminal 63 which is the non-common terminal of resistor 26 is connected to the common terminal 62 of the switch, thereby providing a voltage divider circuit composed of the resistor 26 connected through the terminals 63 and 62 to the resistors 64. Now when the rotary switch is advanced to the second position the terminal 65 will be connected to the common terminal 62, thereby providing a voltage divider network composed of the resistor 27 serially connected through the terminal 65 and 62 to the resistor 64. In this manner the switch can be advanced all the way to the non-common terminal 66 which also will be connected to the common terminal 62, thus providing a voltage divider network composed of resistor 37 serially connected to the terminals 66 and 62 to the resistor 64. The resistors 38–49 compose a second resistor network and each of the non-common terminals such as terminal 67 would be connected to the common terminal 68 as the switch is advanced to provide a voltage divider network composed of, for instance, the resistor 38 serially connected through the terminal 67 and 68 to the resistor 69. In a similar manner the resistors 50–61 represent a third voltage divider network and each of the non-common terminals such as terminal 70 can be connected to the common terminal 71 as the switch is advanced. In this manner, a voltage divider circuit would be composed of a resistor serially connected through the terminals 70 and 71 to the resistor 72. The means for advancing the rotary switch which connects the groups of resistors 26 through 37 and the second group 38 through 49 is the solenoid 73. The means for advancing the switch which connects the resistors 50–61 is a solenoid 74. Each time the solenoid 73 is energized the rotary switch 75 is advanced one additional position. Each time the solenoid 74 is energized the rotary switch 76 is advanced one additional position. It should be noted that the solenoids 73 and 74 are connected through the lines 77 and 78 to the line 79. It should further be noted that the line 79 is connected to ground at terminal 80. Further it should be understood that the other sides of the respective solenoid 73 and 74 are respectively connected through the lines 81 and 82 to the transfer points of the relay 83. As will be explained hereinafter when the relay 83 is energized the solenoids 73 and 74 are both energized to step the rotary switches 75 and 76. Accordingly, it should be understood that the switches 75 and 76 are advanced simultaneously in this system.

The operation of the three resistor networks just described will now be pointed out. If, for instance, the rotary switch 75 were sitting in the first position, thereby connecting the terminal 63 with terminal 62, there would be a voltage developed at terminal 84 (which is the upper terminal of the resistor 64). The voltage there developed is the result of the voltage applied with the terminals 20 and 21 divided between the resistors 26 and 64. At the same time the terminals 67 and 68 would be connected together thereby developing a voltage at point 85. The voltage at terminal 85 is the result of the voltage applied to terminals 20 and 21 proportionately divided by the resistors 38 and 69. At the same time the rotary switch 76 would be in the first position thereby connecting the terminals 70 and 71. The voltage developed at the point 86 would be the result of the voltage applied to terminals 20 and 21 proportionately divided by the resistors 50 and 72.

The voltage developed at terminal 84 is the voltage which determines whether or not the system will continue to select loads which may be energized. It will be noted that the voltage at terminal 84 is applied through the line 87 to the gate terminal 88 of the silicon controlled rectifier (SCR) 89. The control signal at terminal 84 is sufficiently high to bias the silicon controlled rectifier 89 to conduct. The current conducted through SCR 89 will energize the reed relay 90 which will open the normally closed transfer strap 91. In other words, as long as the voltage at terminal 84 does not exceed some selected threshold value, the transfer strap 91, which is normally closed, will remain closed and hence signals which are transmitted to terminal 92 (by the unijunction transistor 93) will be transmitted through the normally closed transfer strap 91 along line 94 to sequentially energize the loads as will be described hereinafter. On the other hand, if the voltage at point 84 exceeds some predetermined value so as to activate the silicon controlled rectifier 89, the reed relay 90 will be energized thereby opening the normally closed transfer strap 91 and terminating any further pulses along line 94 to turn on additional load devices.

The role pf the signal developed at terminal 85 will be considered. This signal developed at terminal 85 is transmitted along the line 95 to the gate terminal 96 of the SCR 97. When SCR 97 conducts, it energizes the reed relay 98 which acts to close the normally opened transfer strap 99. When the normally opened transfer strap 99 is closed, the pulses developed at terminal 92 would be transmitted through the normally open transfer strap 99, along the line 100, to disconnect or de-energize the loads in a sequential order as will be explained hereinafter. Accordingly, it should be understood that if the signal at terminal 85 does not exceed a certain threshold value, the transfer strap 99 will not be closed and hence the loads will not be deenergized. On the other hand, if the signal at terminal 85 does exceed a certain threshold value so as to activate the SCR 97, the transfer strap 99 will be closed and the loads will be sequentially de-energized until the signal at terminal 85 is at a value less than said certain threshold value.

Finally consider the role of the signal developed at terminal 86. The signal at terminal 86 can be transmitted along at least one of the two paths, mainly through the Zener diode 101 or through the Zener diode 102. The Zener diodes 101 and 102 are specifically chosen so that the Zener diode 101 responds to a higher voltage than does the Zener diode 102. In other words a signal will be transmitted through the Zener diode 101 if that signal is of a higher value than would be necessary to transmit the same signal through Zener diode 102. This enables the system to react quickly to a large demand on the system. Accordingly it becomes apparent that if there is a signal which is sufficiently high to be transmitted through Zener diode 101 it will simultaneously be transmitted to Zener diode 102. A signal transmitted through Zener diode 101 will be transmitted along the line 103 to the gate 104 of the SCR 105. If the SCR 105 is activated current will be conducted through the thermal delay relay 106 which when energized (after a period of time) will cause the transfer strap 107 to be closed. When the transfer strap 107 is closed, the relay 83 will be energized thereby transferring each of the transfer straps 108, 109 and 110. When the transfer straps 109 and 108 are transferred they will connect the line 111 to each of the lines 81 and 82 which were discussed earlier. Now as will be explained hereinafter the line 111 is connected to a power source which provides d.c. power to the lines 81 and 82 to energize the solenoid 73 and 74. Hence it becomes apparent that if the signal 86 exceeds the value to "break down" the Zener diode 101 and assuming that that value is sufficient to turn on the SCR 105 (which it is designed to do) the solenoids 73 and 74 will be energized to advance respectively the rotary switches 75 and 76. As mentioned before if the signal at 86 is sufficiently high to be transmitted through the Zener diode 101 it would automatically be transmitted through the diode 102. If this be the case, the signal is transmitted along the line 112 to the gate 113 of the SCR 114. When the SCR 114 conducts it energizes the relay 115 which transfers each of the transfer straps 116, 117 and 118. When the transfer strap 116 is transferred and assuming that the switch 119 is in the position shown (which is the automatic operation position) there will be a signal through the diode 120, through the transfer strap 116, along the line 121, to the gate 122 of the programmable unijunction transistor (PUT) 123. However, the transistor 123 will not be turned on unless the proper potential is applied across its anode and cathode and this depends upon developing a voltage on the capacitor 124. It becomes apparent that the resistor 125 in series connection with the capacitor 124 provides a R-C circuit to develop the voltage across the cathode and anode of the transistor 123. In other words, if the signal at 86 is on for a sufficiently long time such that the voltage developed across the capacitor 124 becomes sufficiently high to enable the transistor 123 to fire (assuming that there is the proper signal applied to the gate 122), then the transistor 123 would fire conducting current to the gate 104 of the silicon controlled rectifier 105. Accordingly SCR 105 would act to energize the relay 106 and the operation would be as described before. It should be noted that there is a manual switch 126 which can be manually operated to energize the relay 83 thereby advancing the rotary switch 75 and 76 to whatever position the operator may desire. In the column 127 of the rotary switch 76 there is shown a plurality of lamps. These lamps are lit when the rotary switch 76 has been advanced to the respective non-common terminals. In this way the operator knows the position of the rotary switch if he wishes to monitor that switch by observation.

Returning to the energization of the relay 115, the transfer of the transfer point 116 has been referred to and the transfer of the strap 117 will now be explained. Actually when the strap 117 is transferred it goes to terminal 128 which is a dummy terminal. Hence it becomes apparent that in the energized position the transfer 117 has no role. However, if the circuit is considered it will be noted that when the relay 115 is unenergized the transfer strap 117 is connected to the terminal 129 and there is a circuit path for the capacitor 124 to be de-energized, i.e., along the line 130, through the non-transferred strap 117, along the line 131 and back to the other side of the capacitor 124. It becomes apparent that when the relay 115 is energized and the system is depending upon developing a voltage across the capacitor 124 it would behoove the system not to provide a discharge path and indeed the system satisfies that requirement.

Finally, the transfer strap 118 in the non-energized position provides a means for lighting the lamp 132 which indicates to the operator that the system is in a set position. However, when the strap 118 is transferred in response to energizing the relay 115 the lamp 133 will be lit indicating to the operator that the system in is a ADV mode of operation.

Consider now the circuitry which is energized by the terminals 134 and 135 in FIG. 3A. The terminals 134 and 135 provide an a.c. signal to the diode 137 which half way rectifies that signal to provide d.c. at the terminals 139 and along the line 141. The capacitors 142 and 143 respectively discharge through the reed relay coils of the relays 90 and 98 to keep those relays energized during the pulsating d.c. periods when they might become de-energized. The resistor 144 in conjunction with the capacitor 145 provides an RC circuit to develop the bias on the emitter 146 of the unijunction transistor 93. When the bias is developed, the unijunction transistor 93 conducts and the output signal at terminal 92 is a series of pulses. The Zener diodes 147, 148, 149 act to provide good regulation for the signal which is applied to the lines 140 and 141 as well as the terminal 139.

Figure 3C:
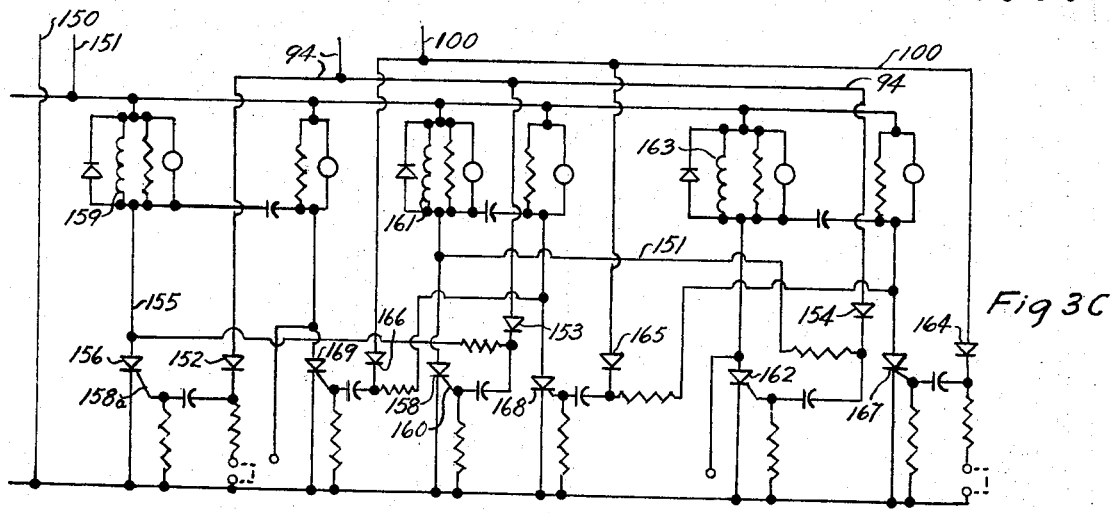
FIG. 3C is a schematic wiring diagram of a load switching means.

Consider now the circuitry in FIG. 3C. The d.c. which is developed by the circuitry of FIG. 3A is applied on the lines 150 and 151 to the circuitry shown in FIG. 3C. It will be recalled that if the relay 90 in FIG. 3A was not energized strap 91 remains closed and hence the train of pulses generated at terminal 92 would be transmitted through the normally closed transfer strap 91 along the line 94 to the line 94 shown in FIG. 3C. Accordingly each of the diodes 152, 153 and 154 is attempting to conduct. However, it will be noted that the diode 153 is back-biased because of its connection to line 155 which is connected to the anode of the SCR 156. In like manner, the diode 154 is back-biased because it is connected by virtue of line 151 to the anode of SCR 158. Hence, it becomes apparent that the only diode that can conduct is the diode 152. Therefore, when a pulse is transmitted along 94 as just described diode 152 will conduct thereby providing bias to the gate 158a of the SCR 156. Accordingly, the SCR 156 will conduct thereby energizing the relay 159 and making it possible for the first load to be energized. In other words, the relay 159 represents a control circuitry for a first load device. When a second energizing puolse is generated at terminal 92 in FIG. 3A and is transmitted through the normally closed transfer strap 91 along 94 the second signal will be received by the diode 153 and 154. However, the SCR 156 conducting the diode 153 will now be forward biased and will conduct to provide a signal to the gate 160 of the SCR 158, thereby causing SCR 158 to conduct. With the SCR 158 conducting, the relay 161 will become energized providing the basis for energizing a second load. With SCR 158 conducting there will be a forward bias put on by diode 154 so that when a third signal is transmitted from terminal 92 to diode 154 it will conduct thereby ultimately energizing SCR 162 which in turn causes the relay 163 to be energized thereby providing a basis for energizing the third load. Now it should be understood that only three loads are shown however, there undoubtedly would be many loads in a system of this type.

Consider for the moment the sequential deenergization of the load. It will be recalled that if the signal at terminal 85 exceeds a certain threshold the relay 98 will be energized and thereby close the transfer strap 99 and provide a train of pulses on line 100. It should be understood that if the signal at terminal 85 exceeds the threshold value that threshold value is such that this same signal appearing at terminal 84 will energize the relay 90 thereby opening the transfer strap 91. In other words, the transfer strap 91 will be opened when the transfer strap 99 is closed. The first pulse received on line 100 will be transmitted to each of the diodes 164 and 165 and 166. In a similar manner to that described to diodes 152, 153 and 154 but in the reversed mode we find that the diode 164 can conduct while the diodes 165 and 166 are unable to conduct because they are reverse-biased. Accordingly the diode 164 will conduct thereby turning the SCR 167 which will turn off the SCR 162 thereby causing the relay 163 to drop out hence de-energizing the last load which was turned on. In other words, relay 163 was the last load turned on and is the first load turned off. With the SCR 167 conducting there will be a negative signal provided to the cathode of diode 165 so that when the next signal comes through the normally opened transfer strap 199, along line 100, the diode 165 will be turned on thereby causing the SCR 168 to conduct which will in turn provide a negative signal to the anode of the SCR 158 causing it to terminate its conduction. The termination of the conduction through the SCR 158 will cause the relay 161 to drop out thereby de-energizing the next to the last load which was turned on. Finally in response to a third signal through the normally open transfer strap 99, the diode 166 will be conducting thereby turning on the SCR 169 which will cause the SCR 156 to terminate its conduction. The termination of the conduction of SCR 156 will cause relay 159 to drop out thereby de-energizing the first load which was turned on.

Having considered the circuitry of the system let us consider a practical example to better understand its operation. Let us assume that the first load represented by the relay 159 is a hot water heating load L1 which has the first priority as far as power demand goes, that the second load is the stair well load L2 which is demanding power virtually all the time during the winter months, and is represented by the relay 161, and that the third load is the snow melting load L3 which is not demanding power all the time because it only requires electrical current when the termperature is below freezing and it is snowing and which is represented by the relay 163.

Further consider that the resistors 26, 27, 28, 29 and 30 have the values 10K, 12K, 14K, 16K and 18K while the resistors 38, 39, 40, 41, and 42 have the values 20K, 22K, 24K, 26K, and 28K, and the resistors 50, 51, 52, 53 and 54 respectively have the values 21K, 23K, 26K, 28K and 30K. Also let us consider that we have determined that the electrical system will not tolerate the snow melting, the stair well loads L2 and L3, and all of the lights of load L4 at the same time. Assume that we have determined that our system can tolerate a certain current demand which will provide a voltage value of 18 at the terminals 20 and 21 when the demand is at its peak value. Under these circumstances we have determined that the threshold value of the signal at 84 will be 3v. while the threshold value of the signal at 85 will be 3v. and that the threshold value of the signal at terminal 86 will be 4 plus 8 in order for us to activate the solenoids 73 and 74. Under these circumstances it can be seen that if simply the water heating load L1 is on, the signal at terminal 84 will be 1 thereby enabling pulses to be transmitted through the transfer strap 91 to energize both the relays 161 and 163, thereby enabling the system so that if the user, if he desires, may turn the stair well load L2 on and the snow melting load L3 on.

It can also be determined by the arithmetic in this example that if for some reason the user "turns on" both the stair well load L2 and the water heating load L1 while the snow melting load L3 is "turned on," the value of the signal 85 would exceed 3 which would, of course, energize relay 90 as well as relay 98 thereby opening the normally closed strap 91 and closing the straps 99, thereby preventing any other loads from being energized and deenergizing the snow melting or dropping out relay 163. Now the snow melting load L3 would only be temporarily disconnected because at the time that the water heating load L1 is turned off, thereby reducing the value of the signal 85 to 1, the relay 98 would drop out and the relay 90 would drop out (closing transfer strap 91) thereby permitting the snow melting load L3 to be reenergized through the energization of the relay 163.

It should be borne in mind that if we were dealing with a plurality of loads greater than three, by way of example, it would be possible that the transfer strap 91 would be open at the same time that the transfer strap 99 would be open in which case no further loads could be turned on but if some of the loads which were allowed to be turned on were in fact turned on, at a later time, the system could exceed its permissible power demand and then the relay 90 would be energized thereby closing the transfer strap 99 to disconnect certain low priority loads.

I claim:
1. A system for sequentially energizing and alternatively deenergizing a plurality of electrical loads in a network so that the overall power demand for said network does not exceed a predetermined level comprising in combination:
   an electrical current sampling means connected to the electrical current supply for said netowrk and capable of producing a d.c. signal representative of the electrical current being supplied to said network;
   first, second and third resistor network means connected to said sampling means to respectively produce first, second and third control signals;

transfer means for automatically connecting and disconnecting resistors in each of said first, second and third resistor networks to respectively alter said first, second and third control signals;

a plurality of electrical load means connected to said supply and arranged to be sequentially energized in response to sequential energizing signals and further arranged to be sequentially de-energized in response to sequential de-energizing signals;

first signal switching means connected to said first resistor network and to said plurality of electrical load means to direct sequential energizing signals to said plurality of electrical load means in response to said first control signal having a value less than a firsst predetermined value;

second signal switching means connected to said second resistor network and to said plurality of load means to direct sequential de-energizing signals to said plurality of load means in response to said second control signal having a value greater than a second predetermined value, third signal switching means connected to said third resistor network and to said transfer means to direct signals thereto for the purpose of activating said transfer means in response to said third control signal having a value greater than a particular value whereby said first, second and third resistor network means have certain resistors connected therein and certain resistors disconnected therefrom thereby altering said first, second and third control signals.

2. A system for sequentially energizing and alternatively deenergizing a plurality of electrical loads in a network according to claim 1 wherein
said electrical current sampling means includes a summing network,
a plurality of full wave rectifiers and
a plurality of transformer means,
the secondaries of each being connected to a different one of said full wave rectifiers and wherein the outputs of each of said full wave rectifiers is connected to said summing network to provide a d.c. signal representative of the sum of the signals provided by said plurality of the full wave rectifiers.

3. A system for sequentially energizing and alternatively deenergizing a plurality of electrical loads in the network according to claim 1 wherein
said first and second resistor network comprise resistors of a double-pole, multi-position solenoid actuated rotary switch and wherein
said third resistor network comprises a set of resistors of a double-pole, multi-position solenoid actuated rotary switch and further wherein
said transfer means include first and second solenoids.

4. A system for sequentially energizing and alternatively deenergizing a plurality of electrical loads in a network according to claim 1 wherein
said first signal switching means includes a first silicon controlled rectifier whose gate is connected to receive said first control signal and whose anode is connected to a first relay means to energize said first relay means when said silicon controlled rectifier conducts and wherein
said relay means has a normally closed transfer strap and wherein there is further included a source of pulses connected to said normally closed transfer strap whereby so long as said first silicon controlled rectifier is deenergized said pulses will pass through said normally closed strap, acting as energizing pulses, to said plurality of loads.

5. A system for sequentially energizing and alternatively deenergizing a plurality of electrical loads in the network according to claim 1 wherein
the said second signal switching means includes a second silicon controlled rectifier whose gate element is connected to receive said second control signal and whose anode is connected to a second relay means and wherein
said second relay means has a normally open transfer strap and wherein
there is further included a source of pulses connected to said normally open transfer strap whereby when said second silicon controlled rectifier conducts said second relay means is energized to close said normally open transfer strap to provide pulse signals therethrough to said plurality of loads with said pulses acting as de-energizing signals.

6. A system for sequentially energizing and alternatively deenergizing a plurality of electrical loads in a network according to claim 1 wherein
said third signal switching means includes a third silicon controlled rectifier connected to receive said third control signal and whose anode is connected to a thermal delay relay and wherein
said thermal delay relay has a normally open transfer strap whereby when said third silicon controlled rectifier is energized said thermal delay relay is energized thereby closing said normally open strap and wherein
there is a fourth relay means connected to said last mentioned normally open relay strap to be energized thereby and wherein
said fourth relay means has transfer straps connected to said transfer means whereby when said fourth relay is energized said normally open transfer straps are transferred to energize said transfer means and thereby connect and disconnect certain resistors in said first, second and third resistor networks.

7. A system for sequentially energizing and alternatively deenergizing a plurality of electrical loads in a network according to claim 6 where there is further included
a Zener diode means connected to said third silicon controlled rectifier and to receive said third control signal and wherein
said Zener diode means has a threshold value which is higher than said particular value.

8. A system for sequentially energizing and alternatively deenergizing a plurality of electrical loads in a network according to claim 6 wherein there is further included
a second Zener diode having a threshold value which is equal to said particular value and wherein
said last mentioned Zener diode has its anode connected to a fourth silicon controlled rectifier to cause said fourth silicon controlled rectifier to conduct when a signal passes through said last mentioned Zener diode and wherein
said fourth silicon controlled rectifier has its anode connected to a fourth relay means and wherein
the transfer straps of said fourth relay means is connected to energize a time delay circuit the output of which is connected to said third silicon controlled rectifier to cause said third silicon controlled rectifier to conduct after a given period of time.

* * * * *